(12) United States Patent
Haka

(10) Patent No.: US 7,011,597 B2
(45) Date of Patent: Mar. 14, 2006

(54) MULTI-SPEED TRANSMISSION

(75) Inventor: Raymond J. Haka, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 118 days.

(21) Appl. No.: 10/807,829

(22) Filed: Mar. 24, 2004

(65) Prior Publication Data

US 2005/0215386 A1    Sep. 29, 2005

(51) Int. Cl.
*F16H 3/44* (2006.01)

(52) U.S. Cl. ...................................... 475/303; 475/286

(58) Field of Classification Search ................ 475/286, 475/271, 280, 288

See application file for complete search history.

(56) References Cited

U.S. PATENT DOCUMENTS

| | | | | |
|---|---|---|---|---|
| 3,815,445 A | * | 6/1974 | Gorrell et al. | 475/286 |
| 4,531,428 A | * | 7/1985 | Windish | 475/279 |
| 6,176,803 B1 | * | 1/2001 | Meyer et al. | 475/286 |
| 6,758,784 B1 | * | 7/2004 | Lee et al. | 475/275 |
| 6,852,059 B1 | * | 2/2005 | Lee et al. | 475/286 |

* cited by examiner

*Primary Examiner*—Roger Pang
*Assistant Examiner*—Justin K. Holmes
(74) *Attorney, Agent, or Firm*—Christopher DeVries

(57) ABSTRACT

A planetary transmission includes four planetary gearsets, two of which are simple planetary gearsets and two of which are compound planetary gearsets. A first of the planetary gearsets has members selectively connectible with a ground or stationary member through a synchronizer clutch. A second, third, and fourth of the planetary gearsets have at least one member continuously interconnected with a ground or stationary member. A plurality of synchronizer clutches are employed between the planetary gearsets, which are manipulatable to establish at least seventeen forward speed ratios and one reverse speed ratio between an input shaft and an output shaft of the transmission.

6 Claims, 1 Drawing Sheet

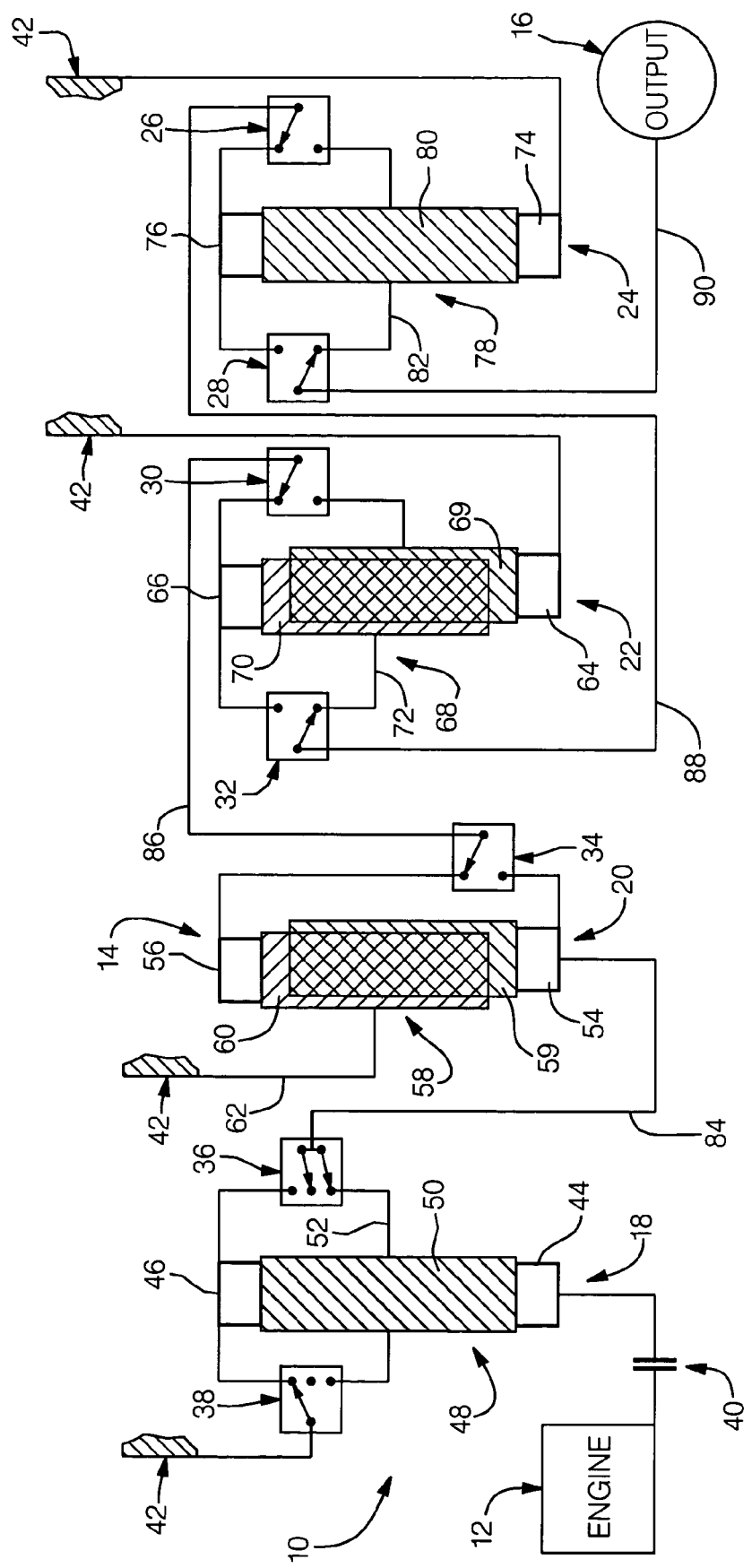

MULTI-SPEED TRANSMISSION

TECHNICAL FIELD

This invention relates to multi-speed transmissions and, more particularly, to multi-speed transmissions having a plurality of synchronizer clutches that are manipulated to engage at least seventeen forward speed ratios and at least one reverse speed ratio.

BACKGROUND OF THE INVENTION

Transmissions utilized with large trucks, such as over-the-road vehicles, include transmissions having between twelve and sixteen forward speed ratios. In many instances, the transmissions currently available are actually a pair of separate transmissions arranged in series to obtain the high number of forward speeds with less pairs of gears. This concept of two transmissions in series causes the ratio progression to repeat as the transmission is stepped up or down through the speed ratios. This makes a geometric progression of the speed ratios the most practical. The vehicles have also generally been designed to expect a top gear, or maximum forward ratio of 1:1, which requires the addition of content to the planetary manual design transmissions. For this reason, most of the commercial trucks employ countershaft type transmissions wherein a plurality of synchronizer or mechanical clutches are included to establish the required speed ratios.

As is well known with countershaft type transmissions, the input shaft of the transmission generally drives a head gear set which then provides input speed to a countershaft on which a plurality of ratio gears are positioned. The ratio gears mesh with gears on the transmission main shaft, which is generally connected with the transmissions output shaft. Synchronizers or mechanical clutches on one of the shafts, main shaft or countershaft, are engaged to establish a drive connection between the respective shaft and gear member thereby the speed ratio on the countershaft to the main shaft is completed.

Planetary-type manual transmissions generally include a splitter gear or splitter planetary set forward of the multi-speed planetary set. For the most part, the planetary set is generally set to provide anywhere from six to eight forward speed ratios and the splitter set doubles that number of speed ratios. However, it is required that the speed ratios of the multi-speed planetary gearset be arranged such that the splitter gear set can effectively provide intermediate ratios. For this reason, the splitter gear set is usually alternately operated in an underdrive ratio and a direct ratio when the multi-speed planetary portion of the transmission is put through its extended range of gearing.

SUMMARY OF THE INVENTION

It is an object of the present invention to provide an improved multi-speed planetary transmission employing synchronizer clutches to provide the desired interconnections between the planetary gearsets of the planetary transmission.

In one aspect of the present invention, four planetary gearsets are arranged in series power flow construction.

In another aspect of the present invention, at least three of the planetary gearsets have an input synchronizer and an output synchronizer.

In yet another aspect of the present invention, each of the synchronizer clutches is operable to provide two ratios within each of the planetary gearsets.

In still another aspect of the present invention, the three planetary gearsets all have one member connected continuously to a ground member such as a transmission housing.

In a further aspect of the present invention, one of the planetary gearsets has a synchronizer clutch connecting at least two planetary members of the transmission housing and the input synchronizer of a downstream planetary gearset provides output drive from this one planetary gearset.

In yet still another aspect of the present invention, an input clutch is provided to disconnect the planetary gearset from the driving engine when it is desired to provide a ratio interchange in the planetary transmission.

In a yet still further aspect of the present invention, two of the planetary gearsets are simple planetary gearsets and two of the planetary gearsets are compound planetary gearsets.

In another aspect of the present invention, the first of the planetary gearsets is operable through the judicious selection of the grounding synchronizer to provide a reverse speed ratio and a forward underdrive ratio.

In yet another aspect of the present invention, the first of the planetary gearsets is operable when the grounding synchronizer is in neutral to provide a direct drive or 1:1 output during portions of the ratios of the planetary transmission.

In yet still another aspect of present invention, two of the planetary gearsets provide an underdrive ratio, an overdrive ratio, and a direct through-drive condition.

In a yet still a further aspect of the present invention, when the two planetary gearsets providing a direct through-ratio, one of the gear members of each of the planetary gearsets is connected to both the input and output synchronizer clutch.

In a yet still further aspect of the present invention, the fourth of the planetary gearsets is operable to provide an underdrive ratio and a through drive ratio.

DESCRIPTION OF THE DRAWING

The drawing is a schematic representation of a powertrain including a multi-speed planetary transmission incorporating the present invention.

DESCRIPTION OF AN EXEMPLARY EMBODIMENT

Referring to the drawing, there is seen a powertrain, generally designated 10, including an engine 12, a planetary transmission 14, and a final drive mechanism 16. The engine 12 is a conventional internal combustion type power plant and the final drive mechanism 16 is a conventional differential mechanism, which is adapted to drive the traction wheels of a vehicle. The planetary transmission 14 includes four planetary gearsets 18, 20, 22, and 24, seven synchronizer clutches 26, 28, 30, 32, 34, 36, 38, and a selectively engageable input clutch 40. The input clutch 40 is a conventional mechanical or hydraulically operated clutch, which is engaged and disengaged usually by the operator to connect and disconnect the engine from the planetary transmission 14. The synchronizer clutches 26, 28, 30, 32, 34, and 38 are conventional two-way synchronizers, which have two operating positions and a neutral condition. The synchronizer clutch 36 is a three-way synchronizer mechanism, which selectively permits the connection of one gear member to an output or two gear members to an output. The synchronizer clutch 38 is connected continuously with a transmission housing or ground member 42, which a stationary portion of the transmission. Thus, the synchronizer clutch 38 will connect gear members with the transmission housing.

The three-way synchronizer clutch can be comprised of a conventional one-way synchronizer and a conventional two-way synchronizer. These synchronizers are combined such that each has a commonly connected element, such as the input hub, and the output rings connected with respective gear elements. For example, the synchronizer clutch 36 can have the output hubs of both a one-way synchronizer and a two-way synchronizer connected with a sun gear member 54 and the output of the one-way synchronizer connected with a planet carrier member 52, and the outputs of the two-way synchronizer connected with the planet carrier member 52 and a ring gear member 46 respectively. By providing selective shifting of the synchronizer rings, a three-way synchronizer is provided. The synchronizers 36 is shown schematically with a common output member and three input members. This combination of structures, a one-way synchronizer and a two-way synchronizer are considered to be conventional devices, since those skilled in the art will recognize the structural possibilities without further description. An alternative assembly for providing a multiple connection synchronizer described in U.S. Ser. No. 10/717,320 filed Nov. 19, 2003 and assigned to the assignee of this application. This patent application describes a plurality of multiple connection synchronizers that will provide the shifting capability used with the present invention.

The planetary gearset 18 includes a sun gear member 44, the ring gear member 46, and a planet carrier assembly member 48. The planet carrier assembly member 48 includes a plurality of pinion gears 50 rotatably disposed on the planet carrier member 52 and meshing with both the sun gear member 44 and the ring gear member 46. The planetary gearset 18 is what is commonly termed a simple planetary gearset; that is, a single pinion meshes between the sun gear member and the ring gear member.

The planetary gearset 20 includes a sun gear member 54, a ring gear member 56, and a planet carrier assembly member 58. The planet carrier assembly member 58 includes a plurality of meshing pinion gear members 59 and 60 that are rotatably mounted on a planet carrier member 62 and disposed in meshing relationship with the sun gear member 54 and the ring gear member 56, respectively. The planetary gearset 20 is commonly termed a compound planetary gearset. In a compound planetary gearset employing an even number of pinion gears, the ring gear member and sun gear member rotate in the same direction when the planet carrier member is held stationary.

The planetary gearset 22 is also a compound planetary gearset having a sun gear member 64, a ring gear member 66, and a planet carrier assembly member 68. The planet carrier assembly member 68 has meshing pinions 69 and 70 that are rotatably mounted on a planet carrier member 72 and disposed in meshing relationship with the sun gear member 64 and ring gear member 66, respectively.

The planetary gearset 24 includes a sun gear member 74, a ring gear member 76, and a planet carrier assembly member 78. The planet carrier assembly member 78 includes a plurality of pinion gears 80 that are rotatably mounted on a planet carrier member 82 and disposed in meshing relationship with both the sun gear member 74 and the ring gear member 76. The planetary gearset 24 is a simple planetary gearset.

The planet carrier member 62 of the planetary gearset 20 is connected with the transmission housing 42, the sun gear member 64 of the planetary gearset 22 is connected with the transmission housing 42, and the sun gear member 74 of the planetary gearset 24 is continuously connected with the transmission housing 42.

The ring gear member 46 and planet carrier member 52 are connected with one side of the synchronizer clutch 38 such that either of these members may be individually connected with the transmission housing 42 and therefore held stationary. The synchronizer clutch 38 has a neutral condition during which both the sun gear member 44 and the ring gear member 46 are free to rotate. The ring gear member 46 and planet carrier member 52 are also drivingly connected with one side of the synchronizer clutch 36, which has an output hub 84 connected to the sun gear member 54 to thereby provide an input member to the sun gear member 54. Thus, the synchronizer clutch 36 is an input clutch for the planetary gearset 20.

The synchronizer clutch 34 is selectively engageable to connect the ring gear member 56 to an output hub 86 or connect the sun gear member 54 to the output 86. The output 86 is connected to an input side of the synchronizer clutch 30. The synchronizer clutch 30 is selectively connectible to the ring gear member 66 and to the planet carrier member 72. Thus, the synchronizer clutch 30 will provide a drive connection between the planetary gearset 20 and the planetary gearset 22.

The synchronizer clutch 32 provides an output clutch for the planetary gearset 22 that is selectively connectible between the ring gear member 66 and an output hub 88 or connectible between the planet carrier member 72 and the output hub 88. The output hub 88 is drivingly connected with the synchronizer clutch 26. Therefore, the synchronizer clutch 32 connects the output power from the planetary gearset 22 with the synchronizer clutch 26, which is an input clutch for the planetary gearset 24.

The synchronizer clutch 26 is selectively engageable to connect the ring gear member 76 with the output hub 88 or to selectively connect the planet carrier member 82 with the output hub 88. The synchronizer clutch 28, which provides output drive from the planetary gearset 24, is connectible with a transmission output shaft 90, which is continuously connected with the final drive mechanism 16. The synchronizer clutch 28 is selectively engageable to connect the ring gear member 76 with the output shaft 90 or selectively connects the planet carrier member 82 with the output shaft 90.

When the synchronizer clutch 38 is connected between the ring gear member 46 and the ground 42, the planetary gearset 18 will provide an underdrive ratio between the sun gear member 44 and the planet carrier member 52. When the synchronizer clutch 38 is connected between the transmission housing 42 and the planet carrier member 52, the planetary gearset 18 will provide a reverse speed ratio between the sun gear member 44 and the ring gear member 46. When the synchronizer clutch 38 is selectively placed in a neutral condition, the ring gear member 46 and planet carrier member 52 are free to rotate and the synchronizer clutch 36 can be adjusted or shifted to connect the ring gear member 46 and planet carrier member 52 together, thereby providing a direct drive through the planetary gearset 18.

The synchronizer clutch 36 is also operable to connect to either the ring gear member 46 or the planet carrier member 52 individually. Thus, the hub 84 can be driven forwardly at an underdrive ratio, reversely at an underdrive ratio, or at a 1:1 drive ratio thereby providing these three input ratios through the sun gear member 54 of the planetary gearset 20.

The synchronizer clutch 34 can be selectively connected between the ring gear member 56 and the hub 86 such that an underdrive ratio is provided in the planetary gearset 20 between the sun gear member 54 and the ring gear member 56. The synchronizer clutch 34 can be selectively positioned to engage the sun gear member 54, thereby providing a direct drive through the planetary gearset 20 to the hub 86.

The synchronizer clutch 30 can selectively engage either the ring gear member 66 or the planet carrier member 72 to thereby connect these members individually with the hub 86. If the ring gear member 66 is connected with the hub 86 and the planet carrier member 72 is connected with the hub 88 through the synchronizer clutch 32, an underdrive ratio is provided at the planetary gearset 22. If the synchronizer clutch 30 is selectively engaged with the planet carrier member 72 and the ring gear member 66 is selectively connected with the hub 88 through the synchronizer clutch 32, an overdrive ratio is provided through the planetary gearset 22. If the ring gear member 66 is connected with both synchronizer clutches 30 and 32, a through-drive or 1:1 ratio is provided.

The hub 88, as previously mentioned, provides input drive to the synchronizer clutch 26. The synchronizer clutch 26, if when connected between the hub 88 and the ring gear member 76, will provide input drive to the ring gear member 76. If the synchronizer clutch 28 is connected between the planet carrier member 82 and the output shaft 90, an underdrive ratio will be provided in the planetary gearset 24. If the synchronizer clutch 26 is selectively engaged with the planet carrier member 82 and the synchronizer clutch 28 is selectively engaged between the ring gear member 76 and output shaft 90, an overdrive ratio is provided in the planetary gearset 24. If both synchronizer clutches 26 and 28 are connected with the ring gear member 76, a direct drive is provided through the planetary gearset 24.

The following two tables provide the engagement sequence and possible speed ratios for the planetary transmission 14. In the following tables, C1 equals planet carrier member 82, C2 equals planet carrier member 72, C3 equals planet carrier member 62, C4 equals planet carrier member 52; S1 equals sun gear member 74, S2 equals sun gear member 64, S3 equals sun gear member 54, S4 equals sun gear member 44; R1 equals ring gear member 76, R2 equals ring gear member 66, R3 equals ring gear member 56, and R4 equals ring gear member 46.

The number of teeth on ring gear member 76 equals eighty-nine, the number of teeth on ring gear member 66 equals eighty-nine, the number of teeth on ring gear member 56 equals eighty-seven, and the number of teeth on ring gear member 46 equals ninety. The number of teeth on sun gear member 74 equals thirty-five, the number of teeth on sun gear member 64 equals thirty-five, the number of teeth on sun gear member 54 equals forty-five, and the number of teeth on sun gear member 44 equals twenty-six.

The ring gear/sun gear tooth ratio for the planetary gearset 24 is 2.543. The ring gear/sun gear tooth ratio for the planetary gearset 22 is 2.543. The ring gear/sun gear tooth ratio for the planetary gearset 20 is 1.923. The ring gear/sun gear tooth ratio for the planetary gearset 18 is 3.462. These numbers are utilized to calculate the speed ratios for the planetary gearsets 24, 22, 20, and 18 as shown in the table below.

Following the engagement schedule of the truth table below, those skilled in the art will readily recognize the power flow paths that are available through the planetary transmission 14. By way of example, in the reverse high ratio, power flows from the engine through the clutch 40 to the sun gear member 44 and through the planetary gearset 18 to the ring gear member 46 and the hub 84. The power flow at the hub 84 flows to the sun gear member 54 and through the planetary gearset 20 to the ring gear member 56, which provides power flow to the planet carrier member 72 and through the planetary gearset 22 to the ring gear member 66, which delivers power flow to the planet carrier member 82, which delivers power through the planetary gearset 24 to the ring gear member 76, which is connected with the output shaft 90.

Thus, in reviewing the chart below, the planetary gearset 18 is in a negative underdrive condition, the planetary gearset 20 is in a positive underdrive condition, the planetary gearset 22 is in a positive underdrive condition, and the planetary gearset 24 is in a positive underdrive condition. This gives a total reverse low ratio of −15.368. It will be noted in the seventeenth forward speed ratio that all of the planetary gearsets are passing direct drives and the overall speed ratio of the planetary transmission is one. It will also be noted that the step ratio between adjacent forward speed ratios is identical for ratios one through sixteen, and the ratio between the sixteenth forward speed ratio and the seventeenth forward speed ratio is 1.17 which is slightly less than the 1.18 step ratio between the other forward speed ratios.

The ring gear/sun gear tooth ratios can, of course, be varied, which will change the speed ratios for each of the planetary gearsets. Therefore, the ring gear/sun gear tooth ratios given above are for example purposes only and are not intended to be limiting features of the present invention. The ring gear/sun gear tooth ratios given were selected to provide a constant step ratio between forward speed ratios. In the following table, when a synchronizer is designated "Open" it is in a neutral condition (i.e., not transmitting power).

TABLE 1

| Gear | Combined Tq Ratio | Step | Planetary (24) | Planetary (22) | Planetary (20) | Planetary (18) |
|---|---|---|---|---|---|---|
| Rev Hi | −7.917 | | 0.718 | 1.648 | 1.933 | −3.462 |
| Rev Med | −11.030 | | 1.000 | 1.648 | 1.933 | −3.462 |
| Rev Lo | −15.368 | | 1.393 | 1.648 | 1.933 | −3.462 |
| | | −1.08 | | | | |
| 1 | 14.216 | | 1.000 | 1.648 | 1.933 | 4.462 |
| | | 1.18 | | | | |
| 2 | 12.018 | | 1.393 | 1.000 | 1.933 | 4.462 |
| | | 1.18 | | | | |
| 3 | 10.204 | | 0.718 | 1.648 | 1.933 | 4.462 |
| | | 1.18 | | | | |
| 4 | 8.626 | | 1.000 | 1.000 | 1.933 | 4.462 |
| | | 1.18 | | | | |
| 5 | 7.292 | | 1.393 | 0.607 | 1.933 | 4.462 |
| | | 1.18 | | | | |
| 6 | 6.191 | | 0.718 | 1.000 | 1.933 | 4.462 |
| | | 1.18 | | | | |
| 7 | 5.234 | | 1.000 | 0.607 | 1.933 | 4.462 |
| | | 1.18 | | | | |
| 8 | 4.440 | | 1.393 | 1.648 | 1.933 | 1.000 |
| | | 1.18 | | | | |
| 9 | 3.756 | | 0.718 | 0.607 | 1.933 | 4.462 |
| | | 1.18 | | | | |
| 10 | 3.186 | | 1.000 | 1.648 | 1.933 | 1.000 |
| | | 1.18 | | | | |
| 11 | 2.694 | | 1.393 | 1.000 | 1.933 | 1.000 |
| | | 1.18 | | | | |
| 12 | 2.287 | | 0.718 | 1.648 | 1.933 | 1.000 |
| | | 1.18 | | | | |
| 13 | 1.933 | | 1.000 | 1.000 | 1.933 | 1.000 |
| | | 1.18 | | | | |
| 14 | 1.634 | | 1.393 | 0.607 | 1.933 | 1.000 |
| | | 1.18 | | | | |

TABLE 1-continued

| Gear | Combined Tq Ratio | Step | Planetary (24) | Planetary (22) | Planetary (20) | Planetary (18) |
|------|-------------------|------|----------------|----------------|----------------|----------------|
| 15 | 1.388 | | 0.718 | 1.000 | 1.933 | 1.000 |
| | | 1.18 | | | | |
| 16 | 1.173 | | 1.000 | 0.607 | 1.933 | 1.000 |
| | | 1.17 | | | | |
| 17 | 1.000 | | 1.000 | 1.000 | 1.000 | 1.000 |

TABLE 2

| Gear | Synchro 26 | Synchro 28 | Synchro 30 | Synchro 32 | Synchro 34 | Synchro 36 | Synchro 38 |
|------|-----------|-----------|-----------|-----------|-----------|-----------|-----------|
| Rev Hi | C1 | R1 | C2 | R2 | R3 | R4 | C4 |
| Rev Med | R1 | R1 | C2 | R2 | R3 | R4 | C4 |
| Rev Lo | R1 | C1 | C2 | R2 | R3 | R4 | C4 |
| 1 | R1 | R1 | C2 | R2 | R3 | C4 | R4 |
| 2 | R1 | C1 | R2 | R2 | R3 | C4 | R4 |
| 3 | C1 | R1 | C2 | R2 | R3 | C4 | R4 |
| 4 | R1 | R1 | R2 | R2 | R3 | C4 | R4 |
| 5 | R1 | C1 | R2 | C2 | R3 | C4 | R4 |
| 6 | C1 | R1 | R2 | R2 | R3 | C4 | R4 |
| 7 | R1 | R1 | R2 | C2 | R3 | C4 | R4 |
| 8 | R1 | C1 | C2 | R2 | R3 | R4 & C4 | Open |
| 9 | C1 | R1 | R2 | C2 | R3 | C4 | R4 |
| 10 | R1 | R1 | C2 | R2 | R3 | R4 & C4 | Open |
| 11 | R1 | C1 | R2 | R2 | R3 | R4 & C4 | Open |
| 12 | C1 | R1 | C2 | R2 | R3 | R4 & C4 | Open |
| 13 | R1 | R1 | R2 | R2 | R3 | R4 & C4 | Open |
| 14 | R1 | C1 | R2 | C2 | R3 | R4 & C4 | Open |
| 15 | C1 | R1 | R2 | R2 | R3 | R4 & C4 | Open |
| 16 | R1 | R1 | R2 | C2 | R3 | R4 & C4 | Open |
| 17 | R1 | R1 | R2 | R2 | S3 | R4 & C4 | Open |

During the first-to-second forward speed ratio interchange, the synchronizer clutches 28 and 30 are manipulated. During the second-to-third forward speed interchange, the synchronizer clutches 26, 28, and 30 are manipulated. During the third-to-fourth forward speed interchange, the synchronizer clutches 26 and 30 are manipulated. During the fourth-to-fifth forward speed interchange, the synchronizer clutches 28 and 32 are manipulated. During the fifth-to-sixth forward speed interchange, the synchronizer clutches 26, 28, and 32 are manipulated. During the sixth-to-seventh forward speed interchange, the synchronizer clutches 26 and 32 are manipulated. During the seventh-to-eighth forward speed interchange, the synchronizer clutches 28, 30, 32, 36, and 38 are manipulated. During the eighth-to-ninth forward speed interchange, the synchronizer clutches 26, 28, 30, 32, 36, and 38 are manipulated. During the ninth-to-tenth forward interchange, the synchronizer clutches 26, 30, 32, 36, and 38 are manipulated. During the tenth-to-eleventh forward speed interchange, the synchronizer clutches 28 and 30 are manipulated. During the eleventh-to-twelfth forward speed interchange, the synchronizer clutches 26, 28, and 30 are manipulated. During the twelfth-to-thirteenth forward speed interchange, the synchronizer clutches 26 and 30 are manipulated. During the thirteenth-to-fourteenth forward speed interchange, the synchronizer clutches 28 and 32 are manipulated. During the fourteenth-to-fifteenth forward speed interchange, the synchronizer clutches 26, 28, and 32 are manipulated. During the fifteenth-to-sixteenth forward speed interchange, the synchronizer clutches 26 and 32 are manipulated. During the sixteenth-to-seventeenth forward speed interchange, the synchronizer clutches 32 and 34 are manipulated.

Note that the planetary gearset 20 remains in the underdrive condition for all drive conditions except the seventeenth speed ratio. It should also be noted that the seventeenth forward speed ratio has been limited to 1:1. Those skilled in the art, however, will recognize that there are at least three overdrive ratios, which are not included in the truth tables.

What is claimed is:
1. A multi-speed power transmission comprising:
an input shaft;
an output shaft;
a stationary housing member;
a first planetary gearset having a sun gear member continuously connected with said input shaft, a ring gear member, and a planet carrier member;
a second planetary gearset having a sun gear member, a ring gear member, and a planet carrier member;
a third planetary gearset having a sun gear member, a ring gear member, and a planet carrier member;
a fourth planetary gearset having a sun gear member, a ring gear member, and a planet carrier member;
a first synchronizer clutch having two active positions for selectively individually interconnecting said ring gear member and said planet carrier member of said first planetary gearset with said stationary housing and a neutral position;
a second synchronizer clutch having three active positions to selectively interconnect said ring gear member, said planet carrier member, and both said ring gear member and said sun gear member of said first planetary gearset with said sun gear member of said second planetary gearset;
a third synchronizer clutch having two active positions for selectively interconnecting said ring gear member and said sun gear member of said second planetary gearset with a fourth synchronizer clutch;
said fourth synchronizer clutch being selectively operable in two active positions to interconnect said third synchronizer clutch individually selectively with said ring gear member and said planet carrier member of said third planetary gearset;
a fifth synchronizer clutch having two active positions for selectively interconnecting individually with said ring gear member and said planet carrier member of said third planetary gearset with a sixth synchronizer clutch;
said sixth synchronizer clutch being selectively operable in two active positions to individually interconnect said fifth synchronizer clutch with said ring gear member and said planet carrier member of said fourth planetary gearset;
a seventh synchronizer clutch having two active positions and being selectively engageable therein to individually interconnect said ring gear member and said planet carrier member of said fourth planetary gearset with said output shaft;
said sun gear members of said third and said fourth planetary gearsets being continuously interconnected with said stationary housing;

said planet carrier member of said second planetary gearset being continuously interconnected with said transmission housing; and said synchronizer clutches being selectively engageable in a plurality of combinations to establish at least seventeen forward speed ratios and a reverse speed ratio between said input shaft and said output shaft through said planetary gearset.

2. The multi-speed power transmission defined in claim 1 further comprising:

an input clutch selectively connectible between a prime mover and said input shaft.

3. The multi-speed power transmission defined in claim 2 further wherein:

each of said synchronizer clutches is selectively active in at least one of their respective active positions to establish eight of said forward speeds and said one reverse speed.

4. The multi-speed power transmission defined in claim 2 further wherein:

each of said synchronizer clutches is selectively active in at least one of their respective active positions to establish eight of said forward speeds and said one reverse speed; and said first synchronizer clutch is in said neutral position, said second synchronizer clutch interconnects both of said ring gear member and said planet carrier member of said first planetary gearset with said sun gear member of said second planetary gearset, and said third, fourth, fifth, sixth, and seventh synchronizer clutches are selectively active in at least one of their active positions during nine of said forward speed ratios.

5. The multi-speed power transmission defined in claim 4 further wherein:

said third synchronizer clutch is in the same active position during sixteen of said forward speed ratios and said reverse ratio.

6. The multi-speed power transmission defined in claim 2 further wherein:

at least three reverse speed ratios are establishable through said planetary gearsets and each of said synchronizer clutches is selectively active in at least one of the active positions during each of the three reverse speed ratios.

* * * * *